United States Patent [19]
Greco

[11] 3,862,247
[45] Jan. 21, 1975

[54] HYDROLYSIS OF PARA-AMINOPHENOL

[75] Inventor: Nicholas P. Greco, Edgewood, Pa.

[73] Assignee: Koppers Company, Inc., Pittsburgh, Pa.

[22] Filed: June 29, 1972

[21] Appl. No.: 267,534

Related U.S. Application Data

[63] Continuation-in-part of Ser. No. 16,545, March 4, 1970, abandoned.

[52] U.S. Cl. ............................ 260/621 M, 423/520
[51] Int. Cl. ............................................ C07c 37/10
[58] Field of Search ................. 260/621 M; 423/520

[56] References Cited
UNITED STATES PATENTS 2,665,313  1/1954  Lisk................................ 260/621 M
3,462,497  8/1969  Greco............................. 260/621 M Primary Examiner—Leon Zitver
Assistant Examiner—Norman P. Morgenstern
Attorney, Agent, or Firm—Oscar B. Brumback; Olin E. Williams

[57] ABSTRACT

Hydroquinone is produced by hydrolizing p-aminophenol in an aqueous solution of ammonium bisulfate. The product hydroquinone is separated from the by-product ammonium sulfate and the by-product regenerated to ammonium bisulfate for use in additional hydrolysis of p-aminophenol.

3 Claims, No Drawings

HYDROLYSIS OF PARA-AMINOPHENOL

CROSS REFERENCE TO RELATED APPLICATIONS

This application is a continuation-in-part of my co-pending application Ser. No. 16,545 filed Mar. 4, 1970, now abandoned.

BACKGROUND OF THE INVENTION

This invention relates to a process for the production of hydroquinone by the ammonium bisulfate hydrolysis of p-aminophenol.

Hydroquinone has been produced commercially through the oxidation of aniline in sulfuric acid by maganese dioxide or sodium dichromate to product quinone and the subsequent reduction of the quinone to hydroquinone through the action of iron dust in water.

Lisk U.S. Pat No. 2,665,313 discloses the production of 1,6-naphthalenediol by heating 1-amino, 6-hydroxynaphthalene in a concentrated aqueous solution of an alkali metal bisulfite to form a bisulfite addition production, the reaction mass is neturalized, then made alkaline, and then heated to hydrolyze the bisulfite addition product and to expel ammonia, and thereafter the reaction mass is rendered acid with sulfuric or hydrochloric acid to produce the 1,6-naphthalenediol.

SUMMARY OF THE INVENTION

In accordance with the invention, hydroquinone is made by the ammonium bisulfate hydrolysis of p-aminophenol. The p-aminophenol is contacted with 1.2-12 moles of ammonium bisulfate per mole of p-aminophenol in an aqueous solution at a temperature of about 200°-300° C. for a time sufficient to hydrolyze the p-aminophenol to the corresponding hydroquinone. The aqueous solution is then cooled and the product hydroquinone is extracted using a suitable inert solvent. Hydrolysis may be repeated by reheating the reaction mixture after extraction. The ammonium sulfate by-product can be regenerated by evaporating the water and heating the melt of the mixed ammonium sulfates at a temperature of 310°-450° C. Upon cooling the resulting ammonium bisulfate is dissolved in water, adjusted to the desired concentration and recycled to the reaction zone. The solvent solution from the extraction step is evaporated to give the hydroquinone product in crude form; subsequent distillation provides the pure product.

DETAILED DESCRIPTION

In accordance with this invention p-aminophenol is hydrolyzed to hydroquinone through the use of an aqueous medium and ammonium bisulfate.

The composition of the hydrolysis medium is important. The minimum requirement for ammonium bisulfate is 1.2 moles per mole of p-aminophenol. The hydrolysis can be carried out in one step or it can be continued sequentially by terminating the reaction, cooling, extracting the product and reheating the hydrolysis mixture without further addition of reactants. A one-step hydrolysis is desirable from the standpoint of ease and efficiency of operation, although an increase in yield can be achieved by a second hydrolysis of the reaction mixture after the product of the first hydrolysis has been extracted. From the standpoint of obtaining high yields in a single hydrolysis step, high concentrations of ammonium bisulfate up to the point of saturation of the aqueous solution is desirable. The point of saturation of the solution is of course dependent upon the amount of water present and upon the temperature at which the ammonium bisulfate is added to the water. Ordinarily, the overall useful range of ammonium bisulfate concentration varies between 1.2 and 12 moles of ammonium bisulfate per moles of p-aminophenol with the preferred range being between 2 and 10 moles. If less than 1.2 moles of ammonium bisulfate are present insufficient conversion results, the reaction time is unduly prolonged, and large amount of starting material remain in the aqueous solution. If more than about 12 moles are used a practical problem arises from the standpoint of handling large quanitites of salt.

Water must be present in an amount sufficient to provide for hydrolysis and also to serve as a diluent or solvent for the p-aminophenol, ammonium bisulfate and the ammonium sulfate formed during the course of the reaction. At least 40 moles of water per mole of p-aminophenol must be present to dissolve sufficient quantities of ammonium bisulfate. As the concentration of ammonium bisulfate is increased, more water, up to about 120 moles is required. The use of excess water results in a practical problem of water removal during the ammonium bisulfate regeneration step.

The reaction temperature can vary over a wide range between about 200°-300° C. If temperatures below about 200° C. are used, an unduly long reaction time is required and the yields are generally insufficient. As the temperature is increased the pressure must be correspondingly increased to maintain the reaction solution in the aqueous phase. At temperatures as high as 300° C. a steam pressure of up to about 1,500 psig is required for this purpose and there is some danger of resin formation if the contact time is too long. No advantage is obtained by increasing or decreasing the pressure to a value other than that sufficient to provide for a liquid reaction medium. To avoid the use of considerable pressure, with the corresponding equipment requirements, temperatures in the range of 220°-260° C. are preferred.

The reaction time or contact time of the reactants during hydrolysis varies with the temperature and to a lesser extent with the mole ratio of the reactants. At minimum temperature, e.g., 200° C. a per pass reaction time of 8 hours is ordinarily required. At 220° C. effective results from the standpoint of yield are obtained using a two pass hydrolysis reaction and a reaction time of 3 hours per pass. Also at 220° C. good results are obtained in a single pass hydrolysis step if the reaction time is extended to 7 or 8 hours. At temperatures above 250° C., depending on the choice of the reactants, hydrolysis can occur in 5 minutes to a half hour. From a practical standpoint an overall per pass hydrolysis time can be considered to be from 5 minutes to 8 hours.

Hydrolysis is carried out in a zone which is resistant to any substantial attack by the ammonium bisulfate or aminophenol. At very low temperatures within the useful range an ordinary glass lined Pfaudler kettle can be used. When higher temperatures and pressurized equipment are required, other construction materials become necessary. At temperatures up to 220°-230° C. Teflon lined reactors are effective. The higher temperature ranges require the use of more durable equipment, such as tantalum lined reactors.

After the period of hydrolysis, the length of time of which is dependent to some extent on whether a single or multiple pass hydrolysis is used, the reaction mixture is cooled. Cooling is required to prevent resinification of the product in the acidic aqueous reaction mixture and to enable the separation of the by-product of organic solvent extraction. Any substantially water-immiscible solvent which will dissolve the product hydroquinone is useful. The preferred solvent is ether.

In the extraction, the organic solvent phase is then separated from the reaction mixture by decantation and the product is removed from the solvent by distillation or other means. Distillation provides a high purity hydroquinone as a product.

After removal of the hydroquinone product, the resulting aqueous effluent reaction mixture can be reheated to the hydrolysis temperature for a second or even a third hydrolysis step. The second and subsequent hydrolysis steps are carried out as before, i.e., by heating the reaction mixture to the appropriate temperature of hydrolysis for the desired period of time, cooling and removing the hydroquinone product by solvent extraction.

Ammonium bisulfate is regenerated for reuse in the process by removing the residual water from the remaining reaction mixture and heating the molten salt, primarily mixed ammonium sulfate, and ammonium bisulfate at atmospheric pressure at a temperature between 310°–450° C. At temperatures below 310° C. an unduly long time is required to effect decomposition. No practical advantages are seen in using temperatures higher than 450° C. and above this temperature the bisulfate tends to decompose. At 330° C., 75–95 per cent of the ammonium sulfate is converted in a few minutes to ammonium bisulfate. Slightly higher conversions are obtained at higher temperatures although this advantage is offset by the increased equipment cost required. During the decomposition of the ammonium sulfate, residual organic materials may be pyrolyzed to black granules resembling activated charcoal; but his charcoal-like material can be removed by dissolving the product in water followed by a filtration step. The ammonia formed during the decomposition can be recovered and used in other chemical processes. The clear, filtered salt solution, the salt portion of which 75–95 per cent is ammonium bisulfate, is adjusted to the desired concentration and is recycled to the reaction mixture for hydrolysis of additional p-aminophenol.

As an illustration of the invention, p-aminophenol (32.7g., 0.3 mole), NH$_4$HSO$_4$ (69.0 g., 0.6 mole) and water (420 g., 23.3 moles) were charged to a glass liner and inserted into a rocking autoclave. After a nitrogen purge, the autoclave was heated to 240° C. in 2 hours and maintained at this temperature for 2 more hours. After cooling to room temperature, 1.4 g. of solids were filtered from the hydrolyzate. The filtrate was extracted with ethyl acetate. The ethyl acetate was neutralized with sodium bicarbonate, filtered and distilled. The residue of crude hydroquinone was 27 g. (81.8%). Distillation of the crude product gave 24 g. (72.7%) of hydroquinone, b.p. 192°–194° C./40 mm., and 2.0 g. (6.1%) of a non-distillable residue.

As a further illustration of the invention the foregoing procedure was repeated except that 60 moles of water per mole of p-aminophenol were used in the reaction medium and the other reaction conditions were varied as illustrated.

| *Mole Ratio | Reaction Conditions | | Hydroquinone Theory (Percent) |
|---|---|---|---|
| | Time Hrs. | Temp. °C. | |
| 1.5 | 2 | 240 | 68.5 |
| 1.5 | 4 | 240 | 71.5 |
| 1.5 | 2 | 260 | 69.8 |
| 2.0 | 2 | 280 | 65.5 |
| 2.0 | 4 | 240 | 66.4 |
| 2.0 | 6 | 256 | 65.1 |
| 2.0 | 4 | 240 | 67.0 |
| 2.0 | 4 | 260 | 58.4 |
| 3.0 | 4 | 240 | 66.3 |
| 4.0 | 4 | 240 | 70.6 |

*Mole ratio of ammonium bisulfate/p-aminophenol

The effluent from the process as illustrated above was regenerated to provide bisulfate for recycling. To this end, the water was evaporated from the effluent, thereby producing a dry salt that was about an equal mixture of ammonium bisulfate and ammonium sulfate. This dry salt was heated in an oil bath; the salt can be stirred easily after reaching 146° C., the melting point of ammonium bisulfate. As heating was continued to a temperature of 312° C., ammonium evolved. The melt was held at this temperature of 312° C. for 12 minutes. An analysis after this time revealed the ammonium bisulfate content to be 95%. During the heating of the melt, the organic material in the melt changed to fine carbonaceous particles. The thermally treated salt mixture was dissolved in water and filtered. After filtering, the filtrate solution was clear. Evaporation of the filtrate yielded light yellow ammonium bisulfate crystals. The ammonium bisulfate so produced was suitable for recycling for use in the hydrolizing step to hydrolize more p-aminophenol to hydroquinone.

What is claimed is:

1. A method of making hydroquinone comprising:
   a. contacting p-aminophenol with ammonium bisulfate in an aqueous solution that contains between 1.2–6 moles of ammonium bisulfate per mole of p-aminophenol and contains 40–120 moles of water per mole of p-aminophenol and that is at a temperature of 200°–300° C. for a period of ½ to 8 hours to hydrolyze said p-aminophenol to hydroquinone,
   b. cooling said hydrolysis reaction mixture, and
   c. extracting said hydroquinone from said p-aminophenol with an inert water-immiscible organic solvent.

2. The method of claim 1 wherein the solution from which the hydroquinone has been extracted is maintained at a temperature of 200°–300° C. for an additional period of time to hydrolyze residual p-aminophenol to hydroquinone.

3. A method of making hydroquinone comprising:
   a. contacting p-aminophenol with ammonium bisulfate in an aqueous solution that contains between 1.2 and 6 moles of ammonium bisulfate per mole of p-aminophenol and that is at a temperature of 200°–300° C. for a period of ½ to 8 hours to hydrolyze said p-aminophenol to hydroquinone,
   b. cooling said hydrolysis reaction mixture,
   c. extracting said hydroquinone from said p-aminophenol with an inert water-immiscible organic solvent, thereafter
   d. evaporating water from said solution to obtain a residue consisting essentially of ammonium sulfate and ammonium bisulfate, and
   e. heating said residue to an elevated temperature of 310°–450° C. to convert said ammonium sulfate to ammonium bisulfate for use in hydrolizing more p-aminophenol to hydroquinone.

* * * * *